(12) United States Patent
Redman et al.

(10) Patent No.: US 9,446,969 B1
(45) Date of Patent: Sep. 20, 2016

(54) SOLAR DRIVEN WATER PURIFICATION AND TRANSPORTATION SYSTEM

(71) Applicants: Charles Redman, Las Cruces, NM (US); Robert Sabin, Colorado Springs, CO (US)

(72) Inventors: Charles Redman, Las Cruces, NM (US); Robert Sabin, Colorado Springs, CO (US)

(*) Notice: Subject to any disclaimer, the term of this patent is extended or adjusted under 35 U.S.C. 154(b) by 0 days.

(21) Appl. No.: 14/707,382

(22) Filed: May 8, 2015

(51) Int. Cl.
| | | |
|---|---|---|
| F25B 15/00 | (2006.01) |
| F25B 17/00 | (2006.01) |
| F25B 27/00 | (2006.01) |
| B01D 3/10 | (2006.01) |
| C02F 1/14 | (2006.01) |
| C02F 1/28 | (2006.01) |
| F25D 13/06 | (2006.01) |

(52) U.S. Cl.
CPC . *C02F 1/14* (2013.01); *C02F 1/28* (2013.01); *F25D 13/06* (2013.01)

(58) Field of Classification Search
CPC ............ C02F 1/14; C02F 1/28; C02F 1/048; C02F 1/02; C02F 1/04; C02F 1/22; B01D 1/0035; B01D 1/0064; B01D 1/0076

USPC ....... 62/101, 106, 238.3, 541; 210/175, 180, 210/188, 257.1, 263, 660, 774; 203/10, 42
See application file for complete search history.

(56) References Cited

U.S. PATENT DOCUMENTS

| | | | |
|---|---|---|---|
| 8,337,170 B2* | 12/2012 | Abdullah | 417/207 |
| 2008/0135475 A1* | 6/2008 | Limcaco | 210/602 |
| 2010/0258426 A1* | 10/2010 | Ng et al. | 203/10 |
| 2011/0048920 A1* | 3/2011 | Avery et al. | 203/10 |
| 2011/0198208 A1* | 8/2011 | Olwig et al. | 203/10 |
| 2013/0341177 A1* | 12/2013 | Ng et al. | 203/10 |
| 2014/0054161 A1* | 2/2014 | Harman et al. | 203/42 |
| 2015/0198355 A1* | 7/2015 | Huang | 126/652 |

* cited by examiner

*Primary Examiner* — Frantz Jules
*Assistant Examiner* — Joseph Trpisovsky

(57) ABSTRACT

A system and method of water purification and transport driven by solar energy. The system includes an absorbent tank containing an adsorbent. The adsorbent absorbs water vapor from raw water at night. A heat exchanger cools the adsorbent. During the day, solar energy is focused at a cylindrical or oval shaped vessel of the adsorbent tank. As the temperature of the adsorbent increases, its capacity decreases, causing it to release purified water. The purified water is transferred to a storage tank. A transmission pipe containing adsorbent granules or capillaries transports the purified water into a product tank.

15 Claims, 4 Drawing Sheets

SOLAR DRIVEN WATER PURIFICATION AND TRANSPORTATION SYSTEM

FIELD OF INVENTION

The present invention relates to the field of water filtration and transport, and in particular, to systems and methods for solar driven water purification, passive water transport, and water purification by means of an absorbent.

BACKGROUND

Purifying water for drinking and industrial applications is essential in many areas of the world. Common methods of water purification include carbon filtration, distillation and reverse osmosis. Carbon filtration is cost effective and may be used in passive systems, however its effectiveness at purifying water is limited. Distillation is a powerful method of producing chemically pure water, however it requires significant energy expenditures. Reverse osmosis is also a powerful filtration method, however it requires pressurized water to work properly. Also, there is much waste product.

Therefore, there exists a need for an effective, energy efficient water purification system that can be used in areas of the world where access to electrical power is limited. The present invention is a water filtration and transport system that is powered by solar energy. Its energy efficient design makes it especially useful in isolated areas or in areas where water is in short supply, such as the Southwest United States.

It is one object of the invention to provide a system and method for purifying water using adsorbent. Another object of the invention is to provide a system and method for purifying water utilizing solar energy. It is another object of the invention to provide an adsorbent to purify water. It is yet another object of the invention to provide a system capable of transmitting of water against gravity. It is another object of the invention to provide a system and method of purifying water while minimizing energy expenditures. It is yet another object of the invention to provide a system and method utilizing adsorbent to sublimate ice, yielding 8.5 pounds of ice for every one pound of vapor formed. Stated another way, an object is to provide a system is capable of forming 8.5 pounds of ice for every pound of sublimated ice.

The present invention utilizes two distinct properties of adsorbent. For water purification, the system cyclically heats and cools adsorbent that has adsorbed water vapor. Since adsorbent capacity decreases with increased temperature, pure water may be harvested from the adsorbent after each heating step.

The present invention creates water vapor by sublimation after at least a first molecular layer of ice is formed on a body of water. To create one pound of sublimated vapor at 32 degrees F., 1218.7 btu must be removed from the ice. To freeze one pound of water at 32 degrees F., 143.34 btu must be removed the water. It is calculated that sublimation of one pound of ice yields one pound of pure vapor and 8.5 pounds of pure ice. In the present invention, pure water is harvested from the vapor and ice formed. Therefore, a total of 9.5 pounds of pure water can be harvested for every one pound of sublimated vapor. Since sublimation requires a removal of more heat than evaporation, a conservative calculation uses 7 pounds of ice formed for every one pound of sublimated vapor. In this calculation, each pound of sublimated vapor yields 8 pounds of purified water. Therefore, the present invention is 8 times more energy efficient at purifying water than a conventional distiller that utilizes evaporation and condensation to purify water.

The present invention also utilizes unique properties of adsorbed liquid. It is noted that in adsorbed water behaves much like a gas in that it is compressible and has a tendency to move from areas of greater density to areas of lower density. This property is utilized in a water transportation system comprising a transmission pipe containing adsorbent material. Water introduced to one end of the transmission pipe tends to travel along the length of the pipe, even overcoming the force of gravity. It is theorized that trees and water tables operate by the same principle.

The objective is, by using an adsorbent, 8.5 pounds of ice can be formed by 1 pound of vapor. That is, the sublimation of one pound of ice freezes 8.5 pounds of water. One pound of sublimated vapor at 32 degrees F. requires 1218.7 btu. One pound of water is frozen by removal of 143,34 btu. After the first molecular layer of ice is formed we are dealing with ice not water. Therefore, one pound of vapor is pure and 8.5 pounds of Ice is pure giving a total of 9.5 pounds of pure water when they are combined. Sublimating ice requires more energy than evaporating water requires and it has been found, by demonstration, that typically 7 pounds of ice is formed by one pound of vapor. This reduction in pounds of ice is due to losses in the system which can be reduced. Therefore, there is an 8 times advantage for the same energy over evaporation and condensation. This is the objective of our patent application.

BRIEF SUMMARY OF THE INVENTION

The present invention provides a system and method for purifying water using solar energy. The system comprises a raw water tank, an adsorption tank, a storage tank, a transmission pipe, and a product tank. The tanks may be positioned at varying elevations and some of the system may be buried underground. In one embodiment, a network of pipes, valves, pumps, and heat exchangers facilitates the movement of water through the system.

The adsorption tank contains adsorbent and is located at a higher elevation than the raw water tank. The adsorption tank is in fluid communication with the raw water tank and capable of receiving water vapor from the raw water tank. The storage tank is connected by pipe to the adsorption tank and in a preferred embodiment, is also connected by pipe to the raw water tank. One embodiment, a heat exchanger is configured to transfer heat from the adsorption tank to the exchanging portion.

In one aspect of the invention, a transmission pipe is fluidly connected to the storage tank. The transmission pipe may be angled upwards towards the earth's surface. The transmission pipe may be filled with adsorbent granules or in a preferred embodiment, the transmission pipe contains capillaries aligned parallel to the transmission pipe. A product tank may be connected by pipe to the transmission pipe so as to receive purified water therefrom.

Purified water from the storage tank way be transported to a higher location and/or across a substantial distance and/or to the earth's surface. The transmission pipe comprises an exposed end that is heated by solar radiation. The increase in temperature at the end of the pipe causes water to be released from the transmission pipe and fall into the product tank.

The present invention also provides a method of solar-powered water purification comprising receiving raw water into a raw water tank and adsorbing water vapor from the raw water into adsorbent located in an adsorbent tank. In a preferred embodiment, the adsorbent is actively cooled while it is adsorbing water vapor. In one aspect, the adsorption tank is cooled by radiative heat transfer. In another aspect, a heat exchanger transfers heat from the adsorbent tank to the storage tank.

Due to the system's configuration and the operation of the system, ice will form in the raw water tank. After the ice is formed, remaining sludge is pumped out of the raw water tank. Next, water is circulated between the raw water tank and the storage tank to melt the ice. After circulation, the water may be transferred back to the storage tank.

DETAILED DESCRIPTION

Figure 1:
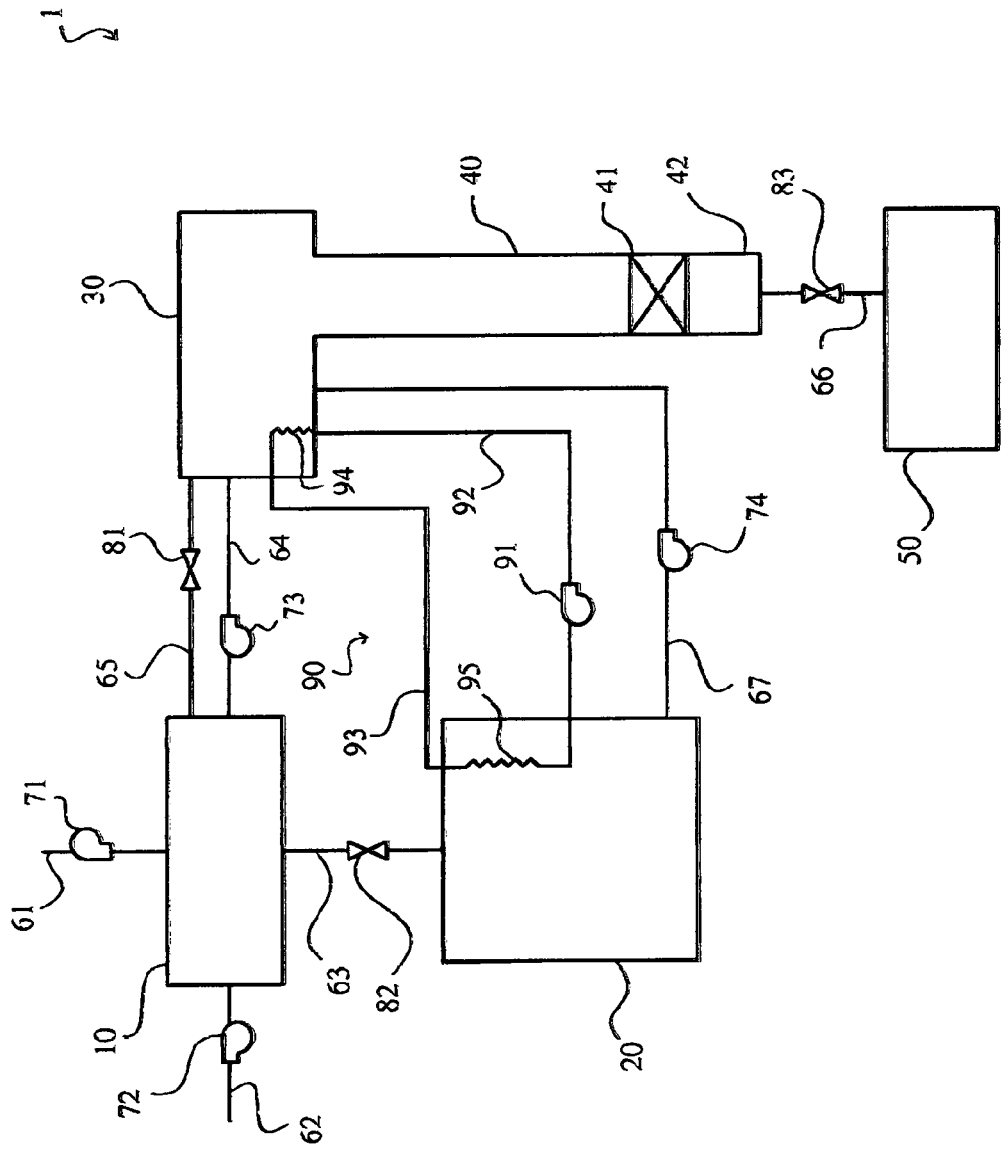
FIG. 1 shows a schematic of one embodiment a solar driven water purification and transport system.

Referring now to FIG. 1, a schematic of a solar driven water purification and transport system 1 is shown. The system 1 comprises a raw water tank 10. A pipe 61 connects to the raw water tank 10. Pump 71 is disposed along pipe 61. In another embodiment, pump 71 may be replaced with a valve. Also connected to the raw water tank 10 is an outlet pipe 62 having a pump 72 disposed thereon. The raw water tank 10 is in fluid communication with an adsorption tank 20 positioned at a second elevation. In a preferred embodiment, the adsorption tank 20 is positioned at a higher elevation than the raw water tank 10. System 1 is configured to only allow water vapor to be transmitted from the raw water tank 10 to the adsorption tank via pipe 63. A valve 82 may be positioned along pipe 63 to selectively interrupt fluid communication between the raw water tank 10 and the adsorption tank 20.

The adsorption tank 20 contains adsorbent. Non-limiting examples of possible adsorbents include materials from trees or commercially available adsorbents such as Molecular Sieve 13×.

The system 1 comprises a storage tank 30. A pipe 67 links the adsorption tank 20 and the storage tank 30. There may be a pump 74 disposed along pipe 67. Storage tank 30 may be positioned at a higher elevation than the adsorption tank 20. Therefore, pump 74 will allow for transmission of fluid through pipe 67 against the pull of gravity. Pipe 67 enables fluid transfer between adsorption tank 20 and storage tank 30. Adsorption tank 20 is located above ground. Storage tank 30 is preferably located below ground for the purpose of thermal insulation. It will be apparent to those skilled in the art in such an embodiment, a valve may be substituted for pump 74.

Heat exchanger 90 thermally links adsorption tank 20 and storage tank 30. Heat exchanger 90 comprises one or more pumps 91, and pipes 92 and 93. Heat exchanger 90 further comprises exchanger portions 95 and 94 which are responsible for heat transfer in adsorption tank 20 and storage tank 30, respectively.

Storage tank 30 is connected to the raw water tank 10 by pipes 64 and 65. Storage tank 30 may be positioned at a higher elevation than the raw water tank 10. Therefore, circulating pump 73 may be disposed along pipe 64 in order to pump water from the raw water tank 10 to storage tank 30. Additionally, valve 81 may be disposed along pipe 65 in order to selectively control flow of water from storage tank 30 to raw water tank 10. Raw water tank 10 is preferably located above ground. Tank 30 may also be located above ground, but is preferably buried underground for increased thermal insulation.

Transmission pipe 40 adjoins storage tank 30 and is in fluid communication with storage tank 30. The transmission pipe 40 may be oriented at an upwardly directed angle with respect to the storage tank 30. In an embodiment where storage tank 30 is located underground, transmission pipe 40 may lead from the storage tank 30 to the earth's surface. Transmission pipe may be adapted to transfer fluid from storage tank 30 to surface level or beyond. In one embodiment, transmission pipe is filled with adsorbent granules. In a preferred embodiment, the transmission pipe is filled with capillaries oriented parallel to the transmission pipe. A transmission valve 41 is disposed along the transmission pipe 40 for controlling the flow of fluid through the transmission pipe. An exposed end 42 of the transmission pipe 40 may be adapted to absorb heat from solar radiation or may be optionally heated electrically, chemically, by a heat exchanger, or by other suitable means.

Product tank 50 is fluidly connected to transmission pipe 40 via pipe 66. There is a valve 83 disposed along pipe 66.

The tanks mentioned herein may be conventional and/or non-conventional tanks of any suitable size and shape, including but not limited to cylindrical or oval shaped. The tank may have a configuration similar to a conventional solar water heating panel.

The valves and pumps mentioned herein may be controlled by an operator or in a preferred embodiment, by purely electronic means. The electronic means may comprise a control system that controls the state of the valves and pumps. In one embodiment, the control system utilizes the time of day as an input. The electronic means may comprise photo sensors linked to the control system. The photo sensors allows the system to adjust its operation based on an intensity of solar energy reaching the system. The electronic means may also comprise temperature sensors for measuring ambient temperature or temperature of the system's components. The temperature sensors may be linked to the control system.

Figure 4:
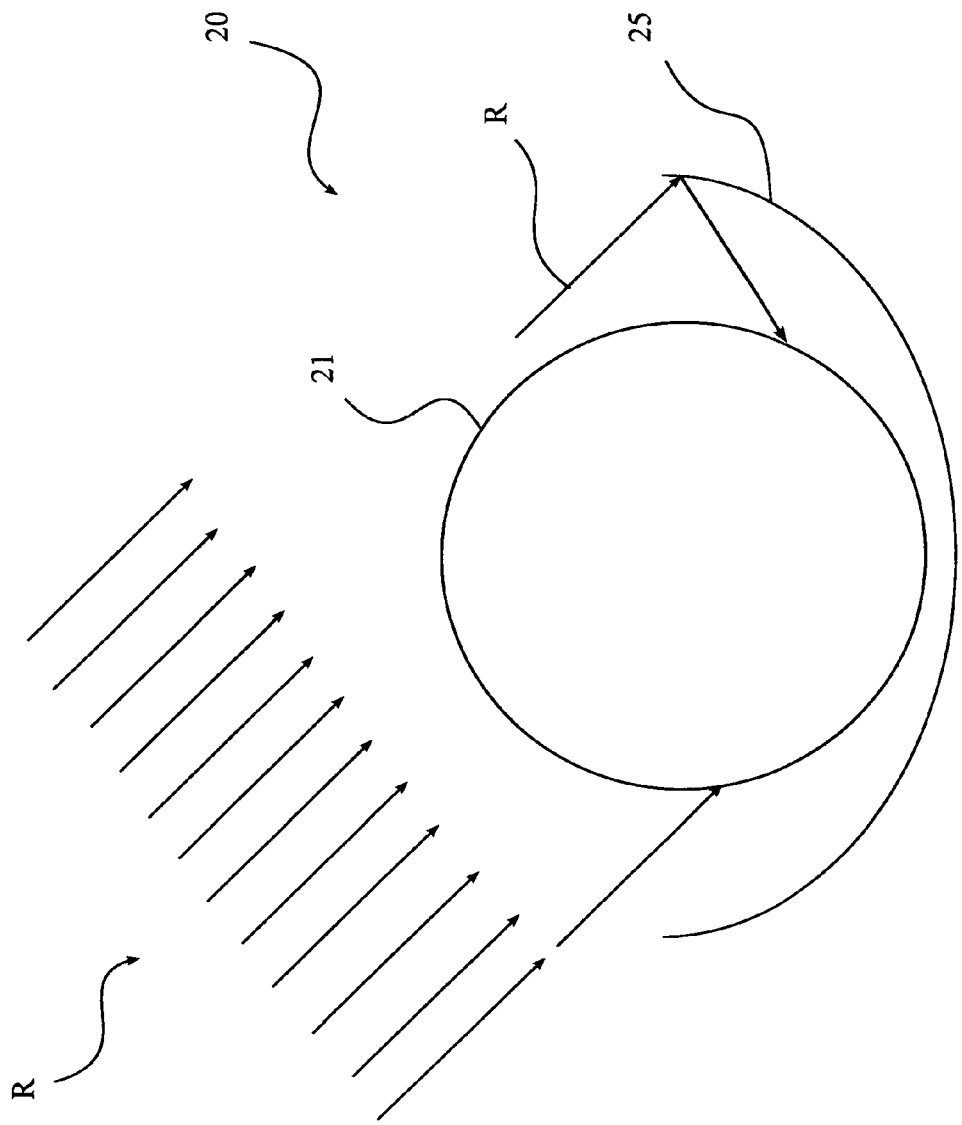
FIG. 4 is a schematic of one embodiment of the adsorption tank.

In a preferred embodiment, adsorption tank 20 is specially designed to absorb solar energy during the day and to transmit thermal energy in the form of radiation during the night. Referring to FIG. 4, adsorption tank 20 comprises a vessel 21 and a reflector 25. Reflector 25 and vessel 21 are positioned and sized to maximize absorption of solar radiation R during the day and maximize outgoing radiative heat transfer during the night. The reflector 25 and vessel 21 may be supported by any suitable mechanical means (not shown) known in the art. In one embodiment, reflector 25 is a panel. Materials for the adsorption tank 20 may be selected to maximize adsorption and/or reflection of solar energy. Non-limiting examples of materials of the adsorption tank 20 include copper and blackened PVC. In one embodiment, vessel 21 comprises one or more 8 inch diameter black PVC pipes oriented parallel to one another.

Adsorption tank 20 contains adsorbent and operates in a similar manner to a solar heated water panel. Since the water in adsorption tank 20 is intended to be cycled on a daily basis, the adsorption tank 20 may be constructed of relatively larger pipes.

The adsorption tank 20 is designed to maximize a daytime and nighttime temperature spread of the adsorbent. In some embodiments, the diameter of the pipes is selected based on a typical intensity of solar radiation and/or typical wind speed at a location of system 1.

A method of operating the solar driven water purification system 1 is disclosed. In a preparatory step, the system is purged with pure water. Referring again to FIG. 1, water is introduced through inlet pipe 61 while pump 71 is activated so as to transfer the pure water from raw water tank 10 to storage tank 30. Water travels through transmission pipe 40. Heat is applied to the exposed end 42 of transmission pipe 40 to release water from the transmission pipe 40. Pure water is then transferred to product tank 50 through pipe 66. All air is removed from the system. The preparatory step is preferably performed during the daytime.

Purified water may be produced via cyclic operation of system 1. First, sludge is introduced to raw water tank 10 through inlet pipe 61 while pump 71 is activated. Next, valve 82 is opened to allow transmission of water vapor through pipe 63 to adsorption tank 20. This action is preferably performed at night, because the cooler ambient temperatures and radiative heat transfer from the adsorption tank 20 will cause the adsorbent inside adsorption tank 20 to become cooler than during the day. However, this is not intended to be limiting. Transmission of water vapor through pipe 63 to adsorption tank 20 may be performed at any time of day. The adsorbent capacity of the adsorbent increases with decreasing temperatures. As an additionally cooling measure, heat exchanger 90 is activated to transfer heat from the adsorption tank 20 to the storage tank 30.

Raw water tank 10, pipe 63, and adsorption tank 20 comprise a closed system. During adsorption, a volume of water in the adsorbent will increase. By the ideal gas law, pressure in the closed system decreases, which in turn increases the evaporation rate inside the raw water tank 10. The raw water in raw water tank 10 will decrease in temperature due to the latent heat of vaporization and may freeze. Additionally, because of latent heat of adsorption, the temperature of the adsorbent will increase. To mitigate the increase in temperature of the adsorbent, vessel 21 and reflector 25 radiate heat away from adsorbent tank 20. Additionally, the heat exchanger 90 transfers heat from the adsorption tank 20 to the storage tank 30.

When adsorption is complete, pump 72 is activated to drain raw water from raw water tank 10. Water may be optionally circulated between raw water tank 10 and storage tank 30 to melt any ice that developed in raw water tank 10. The remaining water in raw water tank 10 may then be transferred back to storage tank 30 through pipe 64.

The system 1 is held at rest until daytime. During the day, adsorption tank 20 absorbs solar energy. The solar energy increases the temperature inside the adsorption tank 20. Since the adsorbent's capacity decreases with increased temperature, the adsorbent will release purified water. After the adsorbent increases in temperature, pump 74 is activated to transfer the purified water from adsorption tank 20 to storage tank 30. In one embodiment, storage tank 30 is located at a lower elevation than the adsorption tank. In this embodiment, a valve may be substituted for pump 74 and the transfer from adsorption tank 20 to storage tank 30 may be completed by gravity. In a preferred embodiment, sensors and/or algorithms are used by the control system to estimate when the adsorbent has reached its maximum temperature. When the adsorbent has reached its maximum temperature, pump 74 is activated to transfer the purified water from adsorption tank 20 to storage tank 30.

In one embodiment, the transmission pipe 40, the product tank 50, pipe 66, and valve 83 are omitted. In this embodiment, water is collected directly from storage tank 30. However, in an embodiment where some of the components are buried, it may be necessary to transfer the purified water to the surface. The transfer may be completed by conventional means such as an electric pump, or it may be completed passively by transmission pipe 40, the product tank 50, pipe 66, and valve 83.

In the embodiment where transmission pipe 40, the product tank 50, pipe 66, and valve 83 are included, water from the storage tank 30 is transmitted to the surface through the storage tank during the day. In a preferred embodiment, an application of heat by solar radiation to the exposed end 42 causes water to be release from the transmission pipe 40 and into pipe 66. In a less preferred embodiment, exposed end 42 may be heated by conventional means such as electric or chemical. The water is transferred through pipe 66 to product tank 50.

It will be apparent to those skilled in the art that transmission pipe 40 has many other applications outside of the present invention. Transmission pipe 40 may be adapted for use in wells, municipal water supplies, and any other application that would benefit from passive water transfer.

It will be apparent to those skilled in the art that there are many other possible systems that are capable of solar driven water purification using an adsorbent. Some of these embodiments are disclosed in detail herein. It is to be understood that the following systems may be operated in a similar manner as was previously disclosed.

Figure 2:
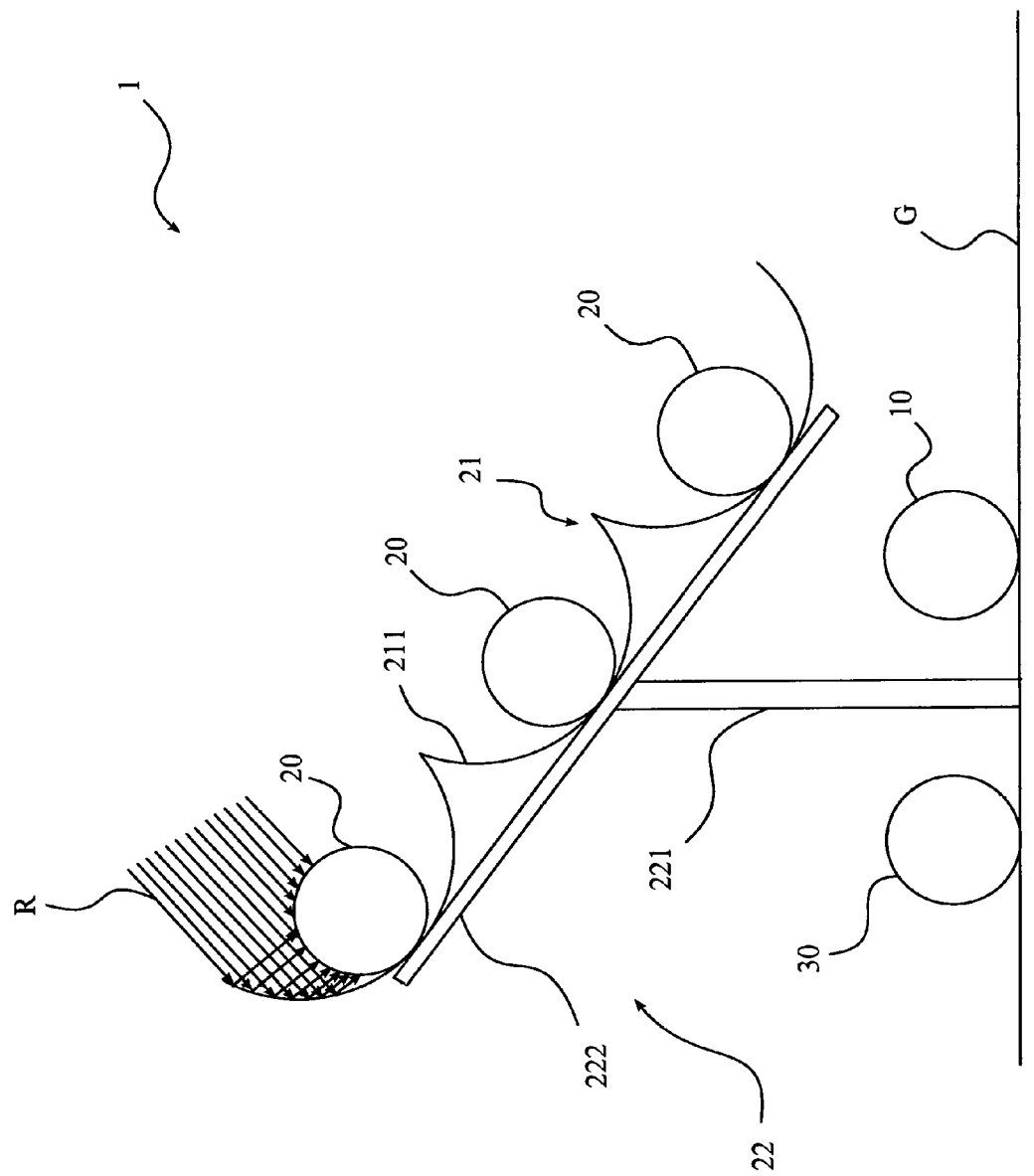
FIG. 2 is a schematic of another embodiment of a solar driven water purification and transport system.

FIG. 2 shows another embodiment of the water filtration and adsorption system 1. A plurality of adsorption tanks 20 are disposed on a reflector 21. Adsorption tanks 20 are pipes. In a preferred embodiment, the pipes have a 4" radius. Solar radiation R is reflected off of reflector 21 and into adsorption tanks 20. Reflector 21 has a radius 211. In a preferred embodiment, the radius 211 is 13.7".

The reflectors 21 and the adsorption tanks 20 are supported by structure 22 comprising post 221 and a mount 222. The mount 222 may be a typical solar panel mount. In a preferred embodiment, the structure 22 is made of steel.

Pure water tank 30 and raw water tank 10 are located on ground G. The raw water tank 10, the adsorption tanks 20, and storage tank 30 are interconnected via a fluid transport means (not shown) in the same general configuration as shown in FIG. 1. The raw water tank 10 is fluidly linked to the adsorption tank 20, the adsorption tank 20 is fluidly linked to the storage tank 30, and the storage tank 30 is fluidly linked to the raw water tank 10. The fluid transport means may comprise pipes, pumps, valves, and/or other components. In addition, a heat exchanger (not shown) thermally links the adsorption tank 20 and the storage tank 30 in the same general configuration as shown in FIG. 1.

Figure 3:
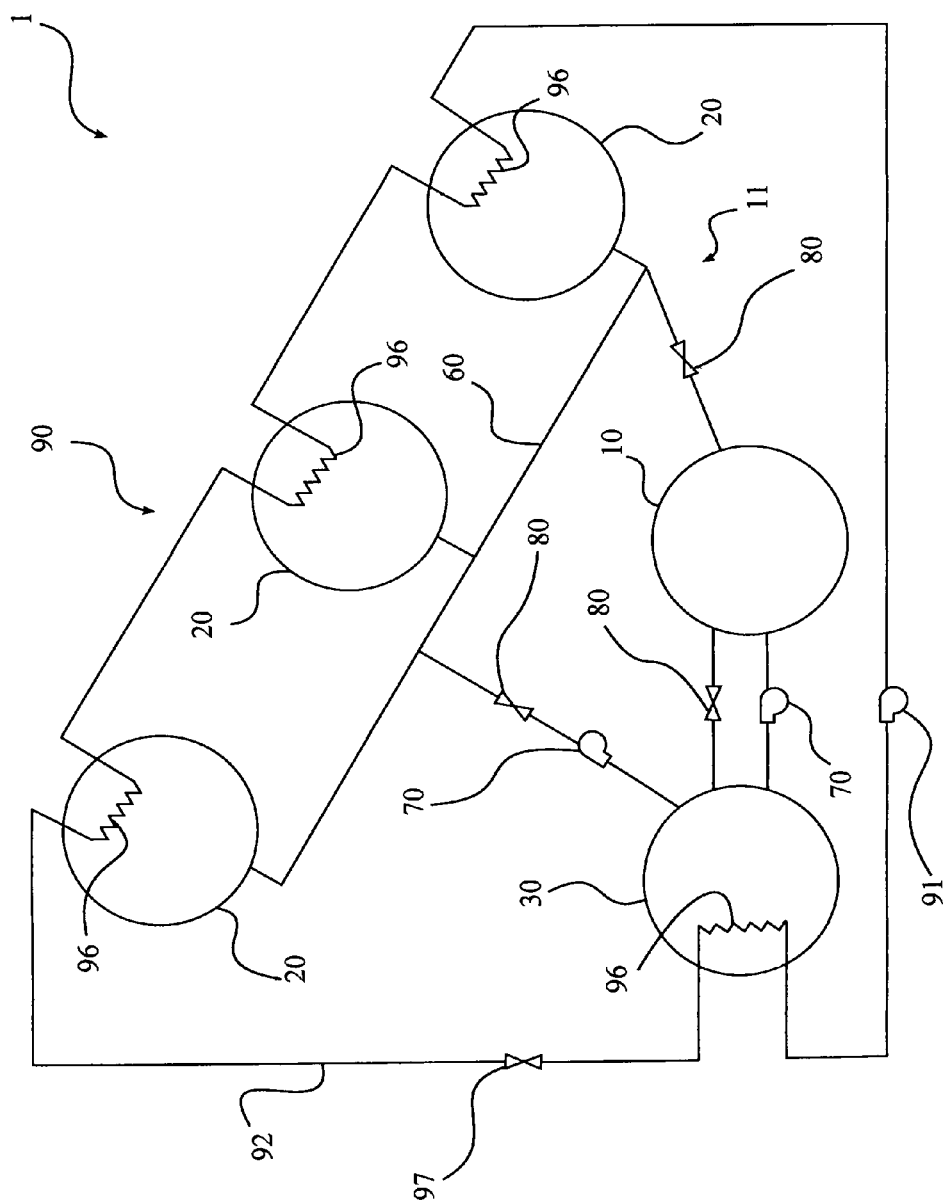
FIG. 3 is a schematic of another embodiment of a solar driven water purification and transport system.

FIG. 3 shows another embodiment of the water filtration and adsorption system 1. The system comprises a raw water tank 10, a plurality of adsorbent tanks 20, and a storage tank 30. The adsorbent tanks 20 are elevated for enhanced absorption of solar energy. The raw water tank 10 and the storage tank 30 are located at ground level. A heat exchanger 90 thermally links the plurality of adsorbent tanks 20 and the storage tank 30. The heat exchanger 90 comprises pipe 92, pump 91, valve 97 and exchanger portions 96. The raw water tank 10, plurality of adsorbent tanks 20, and storage tank 30 are interconnected by a fluid transport system 11. The raw water tank 10 is fluidly linked to the adsorption tank 20, the adsorption tank 20 is fluidly linked to the storage tank 30, and the storage tank 30 is fluidly linked to the raw water tank 10. The fluid transport system 11 comprises a plurality of pipes 60, pumps 70, and valves 80.

Although the present invention has been explained in relation to its preferred embodiments, it is to be understood that many other possible modifications and variations can be made without departing from the spirit and scope of the invention as herein described.

What is claimed is:

1. A method for purifying and transporting water by a system for purifying and transporting water, comprising: a raw water tank having an inlet pipe and an outlet pipe; an adsorption tank containing adsorbent; a storage tank; a first pipe connecting the raw water tank and the adsorbent tank; a second pipe connecting the adsorption tank and the storage tank; third and fourth pipes connecting the raw water tank and the storage tank; and a heat exchanger adapted to transfer heat from the adsorption tank to the storage tank, the method comprising:
    providing the raw water tank, the one or more adsorbent tanks containing adsorbent and adapted to absorb solar energy, and the storage tank;
    providing a first fluid transport system connecting the raw water tank to the one or more adsorbent tanks, a second fluid transport system connecting the one or more adsorbent tanks to the storage tank, and a third fluid transport system connecting the storage tank to the raw water tank;
    adding raw water to the raw water tank;
    vaporizing the raw water by adsorption until a portion of the raw water freezes to form ice;
    removing a liquid portion of the raw water from the raw water tank;
    circulating purified water between the storage tank and raw water tank until at least a majority of the ice melts;
    transferring purified water from the raw water tank to the storage tank;
    exposing the one or more adsorption tanks to solar radiation at least until purified water is released from the adsorbent; and
    transferring purified water from the one or more adsorbent tanks to the storage tank.

2. The method for purifying and transporting water of claim 1, further comprising a passive water transmission system in fluid communication with the storage tank.

3. The method for purifying and transporting water of claim 1, wherein the storage tank is located underground.

4. The method for purifying and transporting water of claim 3, further comprising:
    an elongated transmission pipe in fluid communication with the storage tank and containing adsorbent granules or capillaries; and
    wherein the transmission pipe has a first end proximate the storage tank and a second end located at a substantially higher elevation relative to the first end.

5. The method for purifying and transporting water of claim 4, further comprising:
    a fifth pipe having a third valve, capable of receiving water from the second end of the transmission pipe; and
    a product tank capable of receiving water from the fifth pipe.

6. The method for purifying and transporting water of claim 1, wherein the adsorption tank comprises a plurality of pipes coupled to one or more reflectors.

7. The method for purifying and transporting water of claim 1, further comprising:
    first and second valves disposed along the first and third pipes; and
    first and second pumps disposed along the second and fourth pipes.

8. The method for purifying and transporting water of claim 1, further comprising:
    providing an elongated transmission pipe in fluid communication with the storage tank and containing adsorbent granules or capillaries;
    the transmission pipe having a first end proximate the storage tank and a second end located at a substantially higher elevation relative to the first end; and
    transporting purified water through the transmission pipe from the storage tank to a product tank.

9. The method for purifying and transporting water of claim 1, further comprising:
    providing the heat exchanger adapted to transfer heat between the one or more adsorbent tanks and the storage tank; and
    operating the heat exchanger during said vaporizing the raw water by adsorption.

10. The method for purifying and transporting water of claim 1, wherein said vaporizing the raw water by adsorption occurs at night.

11. The method for purifying and transporting water of claim 1, wherein said exposing the one or more adsorption tanks to solar radiation occurs during daytime.

12. The method for purifying and transporting water of claim 1, wherein said storage tank is located underground.

13. The method for purifying and transporting water of claim 1, wherein said transferring purified water from the one or more adsorbent tanks to the storage tank occurs when a temperature of the adsorbent has reached a maximum.

14. The method for purifying and transporting water in claim 1, wherein said removing a liquid portion of the raw water from the raw water tank occurs when a temperature in the raw water tank has reached a minimum.

15. The method for purifying and transporting water in claim 1, wherein the fluid transport systems are controlled by a control system comprising temperature sensors, photo sensors, and a chronometer.

* * * * *